Figure 1:
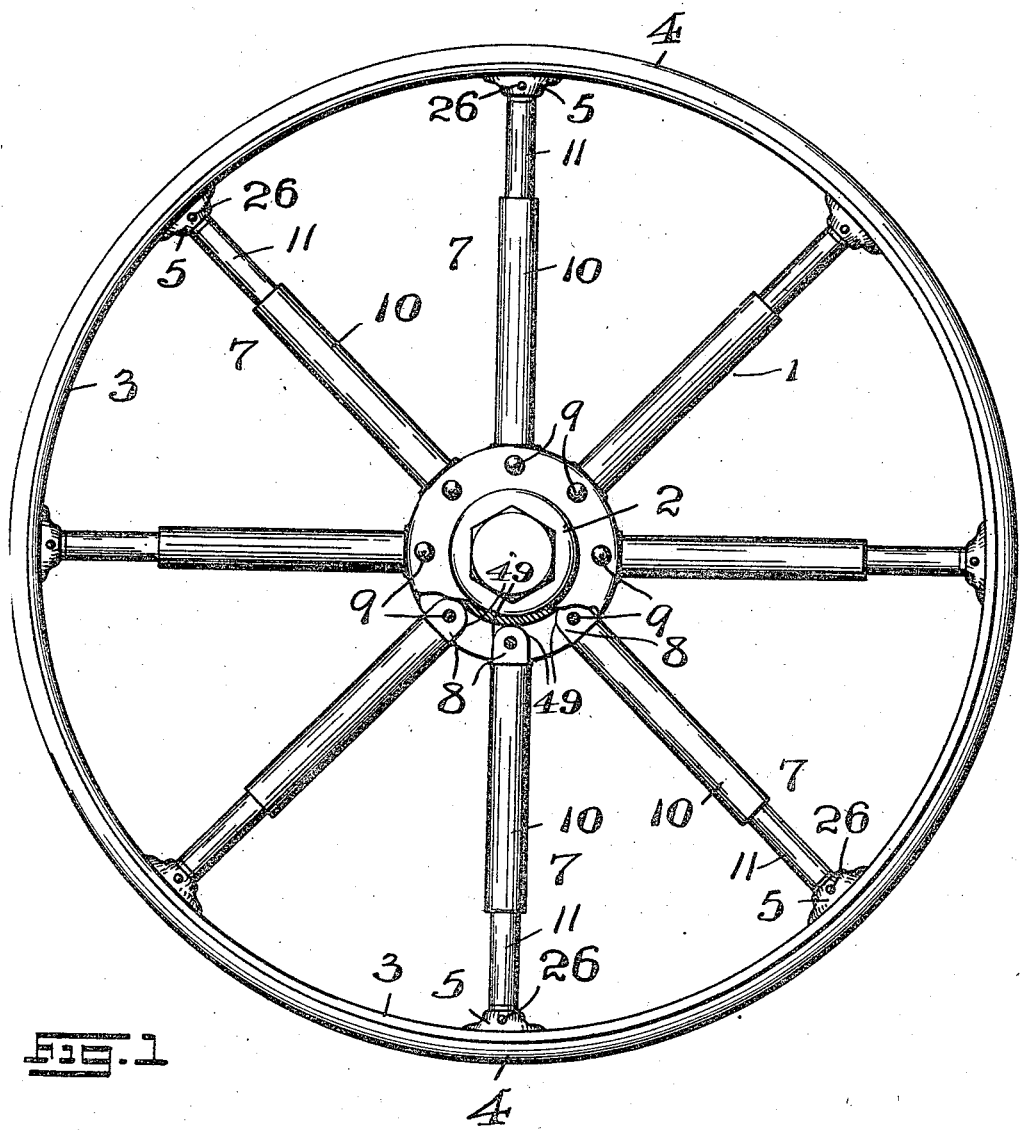

R. E. FIVEY.
RESILIENT WHEEL FOR VEHICLES.
APPLICATION FILED JUNE 25, 1910. RENEWED SEPT. 28, 1912.

1,046,760.

Patented Dec. 10, 1912.
2 SHEETS—SHEET 1.

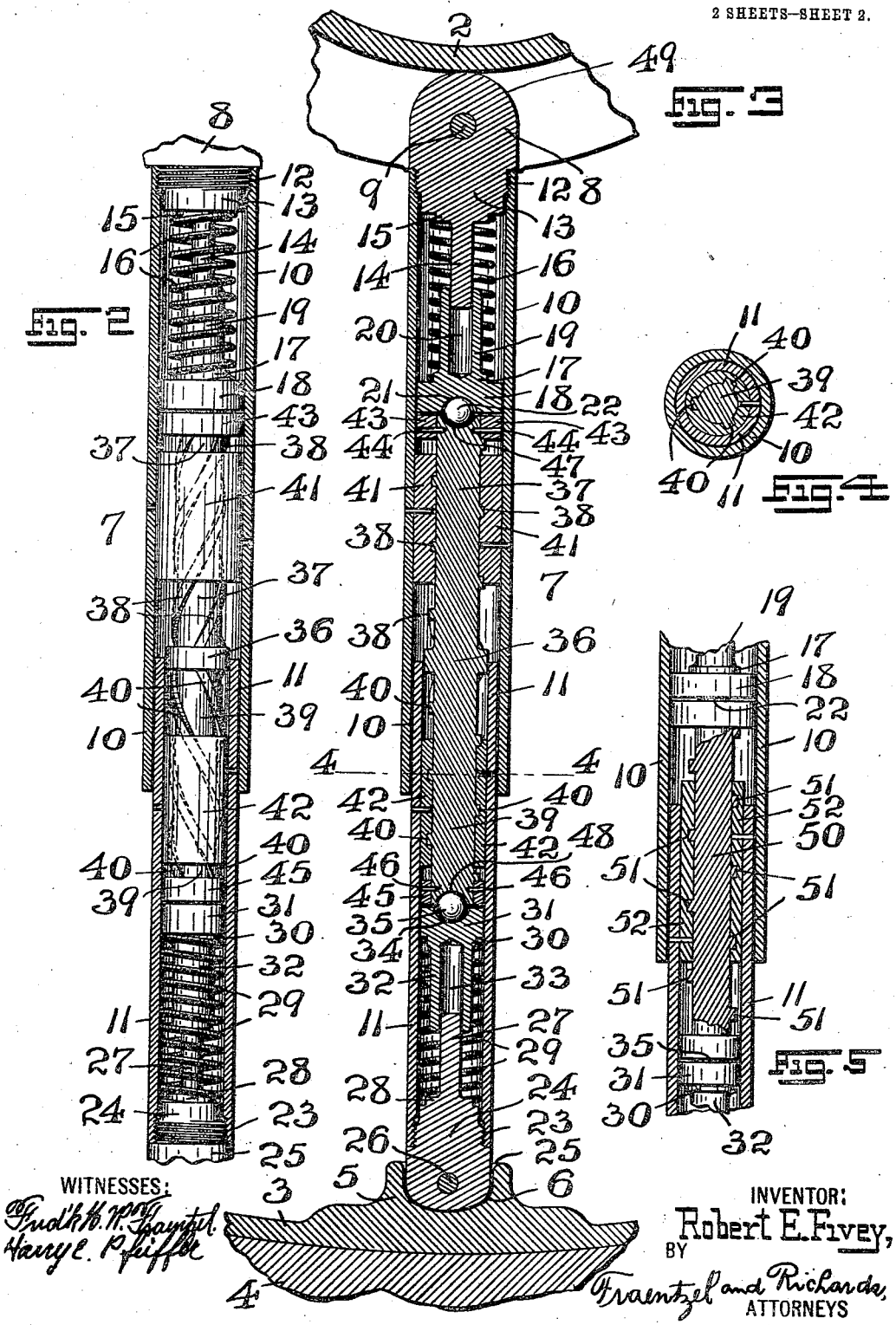

UNITED STATES PATENT OFFICE.

ROBERT E. FIVEY, OF NEWARK, NEW JERSEY.

RESILIENT WHEEL FOR VEHICLES.

1,046,760. Specification of Letters Patent. Patented Dec. 10, 1912.

Application filed June 25, 1910, Serial No. 568,804. Renewed September 28, 1912. Serial No. 722,921.

*To all whom it may concern:*

Be it known that I, ROBERT E. FIVEY, a citizen of the United States, residing at Newark, in the county of Essex and State of New Jersey, have invented certain new and useful Improvements in Resilient Wheels for Vehicles; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in resilient or flexible vehicle wheels, with more particular reference to the adaptability of the said resilient or flexible vehicle wheel for use with or upon automobiles, motor-trucks, and vehicles of a similar character; and, the invention has reference, more particularly, to a novel construction of vehicle wheel so arranged as to absorb and compensate such shocks and jars consequent upon travel over uneven road-surfaces, whereby an easy riding vehicle is provided; and, wherein the strain and stress of said shocks and jars are removed from the vehicle axles.

My invention, therefore, has for its principal object to provide a novel and simple yet strong and durable construction of resilient or flexible vehicle wheel adapted to provide the resilient and cushion effect of the ordinary pneumatic tired wheel, but obviating the necessity and use of a pneumatic tire in connection therewith.

Other objects of this invention not at this time more particularly enumerated will be clearly understood from the following detailed description of my present invention.

With the various objects of the present invention in view, the said invention consists, primarily, in the novel resilient or flexible vehicle wheel hereinafter set forth; and, the invention consists, furthermore, in the novel arrangements and combinations of the several devices and parts, as well as in the details of the construction of the same, all of which will be more fully described in the following specification, and then finally embodied in the clauses of the claim which are appended to and which form an essential part of this specification.

The invention is clearly illustrated in the accompanying drawings, in which:—

Figure 1 is a side elevation of my novel construction of resilient or flexible vehicle-wheel, showing a part of the hub flange broken away to illustrate the connection of the spokes with the hub. Fig. 2 is a detail longitudinal section of one of the novel arrangements and constructions of telescoping spoke, the internal operating parts of which are shown in elevation. Fig. 3 is a similar detail longitudinal section of said telescoping spoke with all of its internal parts shown in section. Fig. 4 is a horizontal section of said telescoping spoke, said section being taken on line 4—4 in said Fig. 3. Fig. 5 is a detail longitudinal section of a portion of one of said novel telescoping spokes, illustrating, however, a slightly modified form of certain of its internal parts.

Similar characters of reference are employed in all of the hereinabove described views, to indicate corresponding parts.

Referring now to the several figures of the drawings, the reference-character 1 indicates the complete construction of resilient or flexible vehicle wheel embodying the principles of my present invention, the same comprising a hub-member 2 and a rim or felly-portion 3. The said rim or felly-portion 3 may be adapted to carry any desirable type of tire 4, such as a metallic, wooden, rubber, or other tire. Suitably secured upon the inner side of said rim or felly-portion 3 are a plurality of spoke-seats 5, the same being preferably arranged to form an integral part of said rim or felly-portion 3. Said spoke-seats 5 are constructed to provide a receiving socket or chambered portion 6 adapted to receive and operatively connect with said rim or felly-portion 3, the outer end of a novel construction of spoke 7. The inner end-portion 8 of said spoke 7 is adapted to be secured by means of transverse pins 9 to and between the flanges of said hub-member 2. The said novel construction of spoke 7 comprises a pair of telescoping tubular members respectively indicated by the reference-characters 10 and 11. The upper end of said tubular-member 10 is provided with internal screw-threads 12 adapted to receive the screw-threaded shank 13 of said end-portion 8, to connect said tubular member 10 therewith. Connected with and preferably forming an integral part with said shank 13 is a downwardly extending plunger-pin 14, provided at its base with a shoulder 15 adapted to provide a means for seating a coil-spring 16. The opposite end of said coil-spring 16 is seated upon or around a shoulder 17 so as to bear against the flanged end 18 of a cylinder-pin 19, which is slidably arranged within said tubular member 10. Said cylinder-pin 19 is provided with a chambered portion 20 adapted to receive the said plunger-pin 14, which is slidably arranged therein. The under side of the flanged end 18 of said cylinder-pin 19 is provided with a seat 21 adapted to seat a ball-bearing 22. The lower end of said tubular member 11 is provided with internal screw-threads 23 adapted to receive the screw-threaded shank 24 of a rim-lug 25 which is seated in said receiving socket or chambered portion 6 of said spoke-seat 5, being retained in this connected position by means of the transverse pin 26. Connected with and preferably forming an integral part with said shank 24 is an upwardly extending plunger-pin 27, provided at its base with a shoulder 28 adapted to provide a means for seating a coil-spring 29. The opposite end of said coil-spring 29 is seated upon or around a shoulder 30 so as to bear against the flanged end 31 of a cylinder-pin 32, which is slidably arranged within said tubular member 11. Said cylinder pin 32 is provided with a chambered portion 33 adapted to receive said plunger-pin 27, which is slidably arranged therein. The upper side of the flanged end 31 of said cylinder-pin 32 is provided with a seat 34 adapted to seat a ball-bearing 35. Loosely arranged in said telescoping tubular members 10 and 11 is a worm-member 36 provided with an upwardly extending shank 37 having right threads 38 and a downwardly extending shank 39 having left threads 40. Secured in a proper location within said tubular member 10, by being brazed and pinned thereto, or otherwise rigidly connected therewith, is a nut-member 41 adapted to engage the right threads 38 of said upwardly extending shank 37 of said worm-member 36. In like manner, secured in a proper location within said tubular member 11, by being brazed and pinned thereto, or otherwise rigidly connected therewith, is a nut-member 42 adapted to engage the left threads 40 of said downwardly extending shank 39 of said worm-member 36. Said upwardly extending shank 37 of said worm-member 36 is provided at its free end with a collar 43 secured thereto by means of pins 44, or otherwise fastened. In like manner, the downwardly extending shank 39 of said worm-member 36 is provided at its free end with a collar 45 secured thereto by means of pins 46, or otherwise fastened. The free ends of said respective shanks 37 and 39 are provided with the respective bearing seats 47 and 48 adapted to seat, respectively, the ball-bearings 22 and 35. The said end-portion 8 is provided at its upper end with a semi-circular bearing-portion 49 adapted to lie tangent to the surface of said hub-member 2.

As thus constructed and arranged, the spokes 7 are elastic and designed to absorb shocks and jars. The operation of said spokes in combination with the other parts of said resilient or flexible wheel, is as follows: A shock or jar imparted to the tire 4 and rim or felly-portion 3 is carried to the spokes 7 which are adjacent to the point of shock. The said spoke being formed of telescoping parts, the said parts slide one toward the other causing a compression of the respective springs 16 and 29. In addition to the compression of said springs 16 and 29, a yielding resistance to the action of said telescoping members 10 and 11 is afforded by the worm-member 36 which is caused to turn upon the ball-bearings 22 and 35, when the respective nuts 41 and 42 are moved in contact respectively with the right thread 38 of said upwardly extending shank 37 and the left thread 40 of said downwardly extending shank 39. In this manner, the shock or jar upon the tire and rim or felly-portion is absorbed by the operation of the internal parts of said spokes 7. In addition to the mechanical resistance offered by the coil-springs 16 and 29 and the worm-member 36, there is a pneumatic resistance afforded by the compression of the air in the chambered portions 20 and 33 of said cylinder-pins 19 and 32, caused by the inward movement of the respective plunger-pins 14 and 27 thereinto. Since the rim or felly-portion 3 is an integral part, its vertical movement, as it follows the yielding spoke 7, must necessarily be the same at all points in its circumference; hence, a lateral yielding of the laterally radiating spokes 7 must be provided for in order that the resilient and flexible qualities of the spoke acted upon may extend throughout the wheel as a whole. To accomplish this end, the spokes 7 are secured to the flanges of the hub-member 2 by means of the end-portion 8, which is provided with a semi-circular bearing-portion 49 to permit a yielding movement of the spoke upon the transverse pins 9 forming a fulcrum upon which said lateral movement of said spoke may center. In like manner, the connection of said spoke 7 at the rim or felly-portion of the wheel must also be flexible; hence, there is a certain amount of lateral play between the rim-lug 25 and said spoke-seats 5, this movement being also centered and directed by the transverse pins 26.

It will thus be readily understood, that the whole wheel is resilient and flexible, and that jars and shocks imparted to the tire and rim or felly-portion will be absorbed by the shock-absorbing internal mechanism of said novel construction of telescoping spokes 7, thus providing a wheel adapted to render the vehicle easy riding and stable without the use or necessity of pneumatic or other elastic or resilient tires.

Referring now more particularly to Fig. 5 of the drawings, I have illustrated therein a slightly modified construction of the internal mechanism of said telescoping spoke 7 formed by the tubular members 10 and 11. In this construction, instead of using a double or right and left-threaded worm, as 36, I employ a single shank 50 provided with threads 51 which may be either left or right, and a single nut-member 52 engaging with said threads 51, the said nut-member being rigidly connected with the tubular member 11. The operation and effect of this modified construction is substantially the same as that described above in connection with the main and preferred construction.

I am aware that changes may be made in the arrangements and combinations of the various devices and parts, as well as in the details of the construction of the same, without departing from the scope of my present invention, as described in the foregoing specification and as set forth in the following claims. Hence, I do not limit my invention to the exact arrangements and combinations of the devices and parts as herein described, nor do I confine myself to the exact details of the construction of the said parts as illustrated in the accompanying drawings.

I claim:

1. A resilient vehicle wheel comprising a hub-member and a rim, a plurality of telescoping spokes radiating between said hub-member and said rim, said telescoping spokes comprising a pair of telescoping tubular members, means connected with the respective tubular members for connecting the same, respectively, to said hub-member and said rim, a plunger-pin rigidly connected with each tubular member, a cylinder-pin movably arranged in each tubular member and adapted to receive said respective plunger-pins in sliding engagement therewith, a spring arranged between each plunger-pin and cylinder-pin, and means arranged between and engaging said cylinder-pins adapted to offer resistance to the telescoping action of said tubular members, said means comprising a worm-member and nuts connected, respectively, one with each of said tubular members, said nuts engaging the threads of said worm-member, substantially as and for the purposes set forth.

2. A resilient vehicle wheel comprising a hub-member and a rim, a plurality of telescoping spokes radiating between said hub-member and said rim, said telescoping spokes comprising a pair of telescoping tubular members, means connected with the respective tubular members for connecting the same, respectively, to said hub-member and said rim, a plunger-pin rigidly connected with each tubular member, a cylinder-pin movably arranged in each tubular member and adapted to receive said respective plunger-pins in sliding engagement therewith, a spring arranged between each plunger-pin and cylinder-pin, and means arranged between and engaging said cylinder-pins adapted to offer resistance to the telescoping action of said tubular members, said means comprising a worm-member and nuts connected, respectively, one with each of said tubular members, said nuts engaging the threads of said worm-member, and ball-bearings arranged between each of said cylinder-pins and the respective ends of said worm-member, substantially as and for the purposes set forth.

3. A resilient vehicle wheel comprising a hub-member and a rim, a plurality of telescoping spokes radiating between said hub-member and said rim, said telescoping spokes comprising a pair of telescoping tubular members, a nut connected rigidly within each tubular-member, a worm-member loosely mounted within each telescopic spoke, the threads of said worm-members being operatively engaged by said respective nuts of said tubular member, and means for mounting between the ends of said worm-members and the outer ends of said tubular members, coiled springs, substantially as and for the purposes set forth.

In testimony, that I claim the invention set forth above I have hereunto set my hand this 23rd day of June, 1910.

ROBERT E. FIVEY.

Witnesses:
    FREDK. C. FRAENTZEL,
    FREDK. H. W. FRAENTZEL.